United States Patent [19]

Robichaud et al.

[11] 4,172,797

[45] Oct. 30, 1979

[54] DUAL MEDIA FILTER

[75] Inventors: Arthur W. Robichaud, Atlantic Highlands; Theodore C. Sauer, Greenbrook, both of N.J.

[73] Assignee: Purolator, Inc., Rahway, N.J.

[21] Appl. No.: 868,625

[22] Filed: Jan. 11, 1978

[51] Int. Cl.² .............................................. B01D 27/06
[52] U.S. Cl. .................................. 210/443; 210/492; 210/493 B
[58] Field of Search ........... 210/487, 489, 492, 493 R, 210/493 B, 493 M, 493 FR, 440, 443

[56] References Cited

U.S. PATENT DOCUMENTS

| | | | |
|---|---|---|---|
| 3,348,695 | 10/1967 | Rosaen | 210/493 X |
| 3,867,294 | 2/1975 | Pall et al. | 210/489 |
| 4,033,881 | 7/1977 | Pall | 210/493 B X |
| 4,058,463 | 11/1977 | Bartik | 210/489 X |

*Primary Examiner*—William A. Cuchlinski, Jr.
*Attorney, Agent, or Firm*—Kenyon & Kenyon

[57] ABSTRACT

As exemplified by an automobile engine oil filter, the usual pleated filter paper is internally supported by an interpleated layer of high tear and tensile strength material which is substantially more flexible than the paper. With the ends of both layers anchored conventionally in the element's end caps rigidly held apart by the usual perforated center tube, the flexible material is subjected to a tensile stress when the paper attempts to move inwardly, the paper being thereby supported against rupturing or pleat tear. The flexible material thus functioning as a back-up layer for the paper, can be pretensioned to provide greater additional resistance to inward movement of the paper.

10 Claims, 7 Drawing Figures

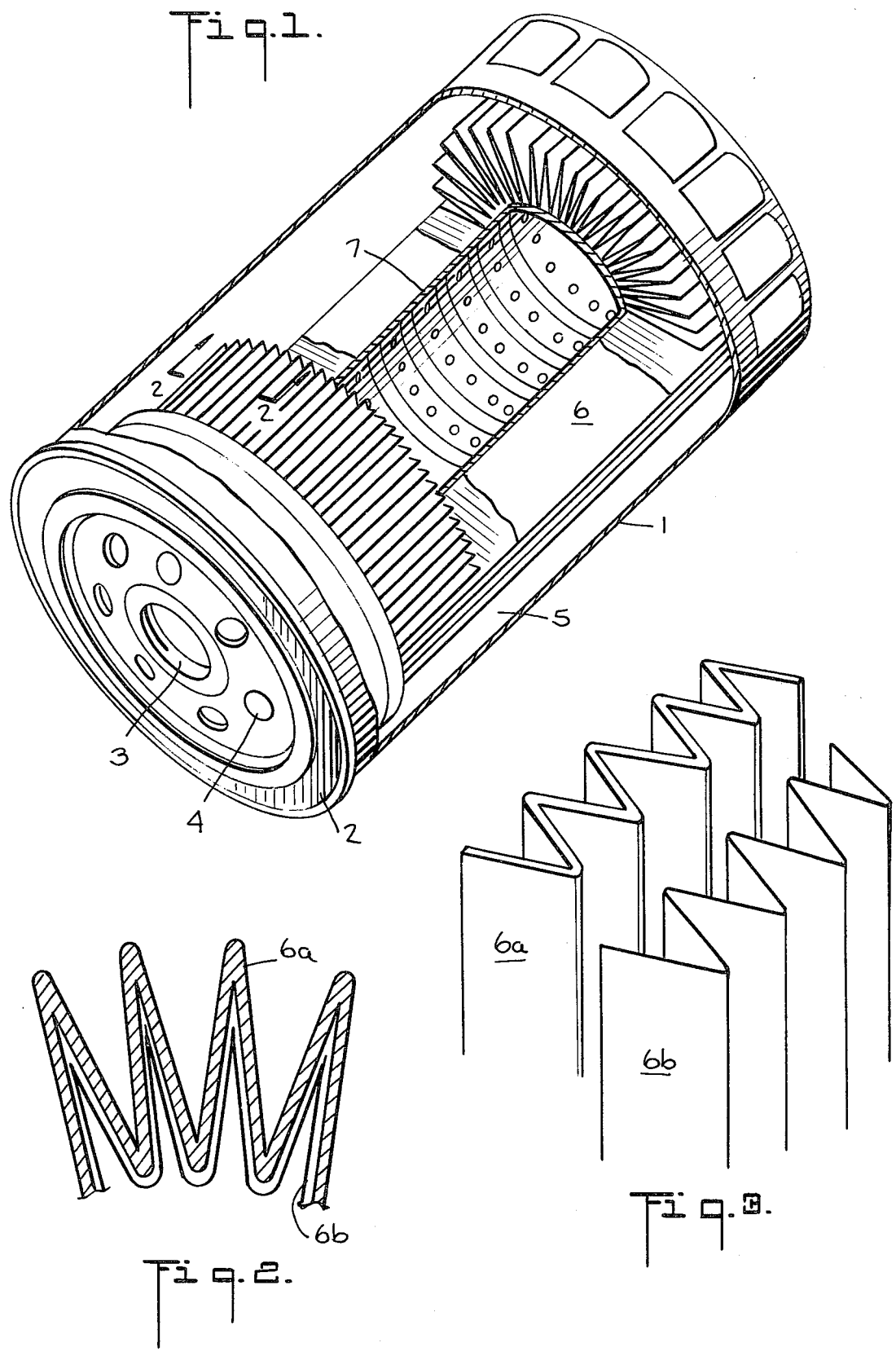

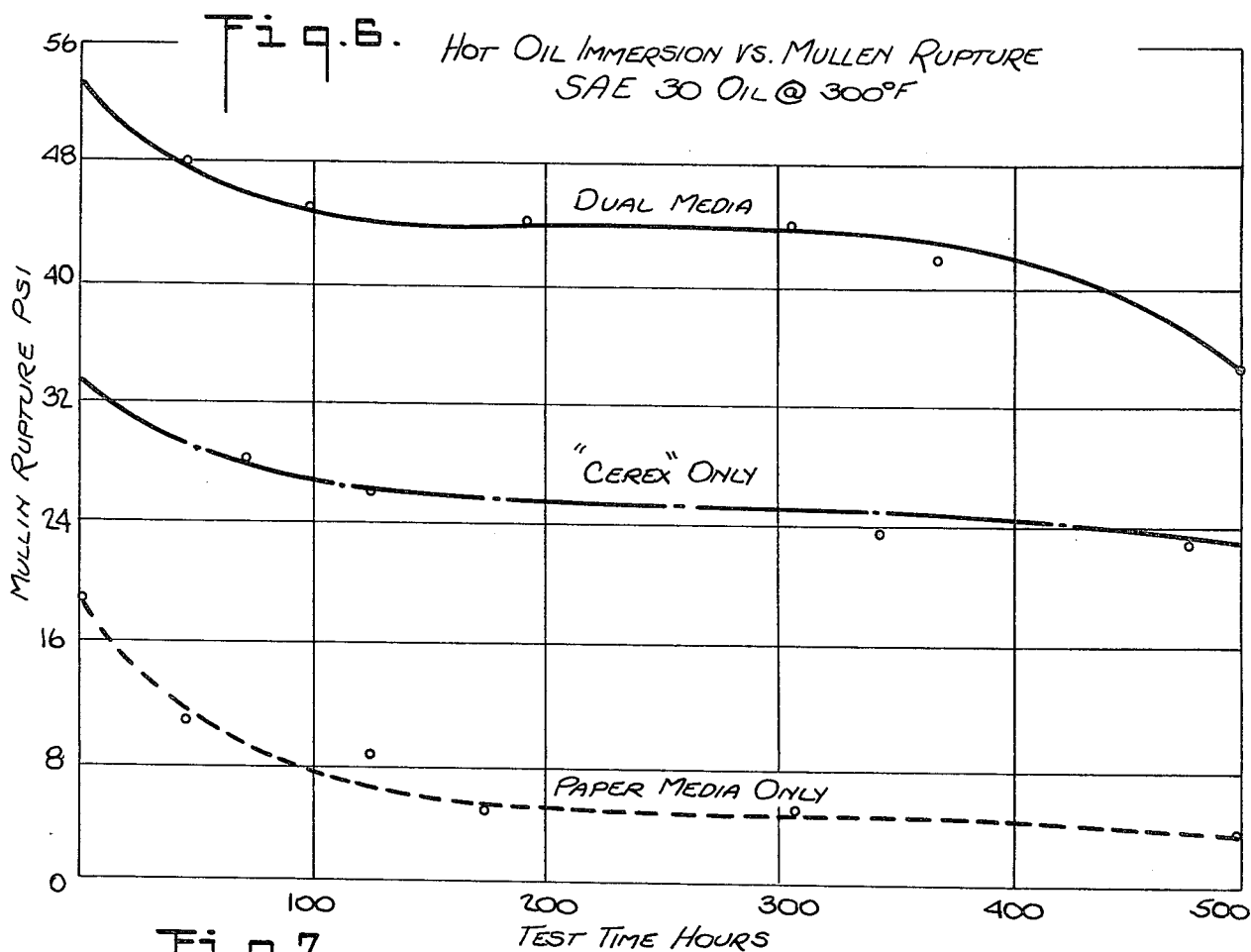
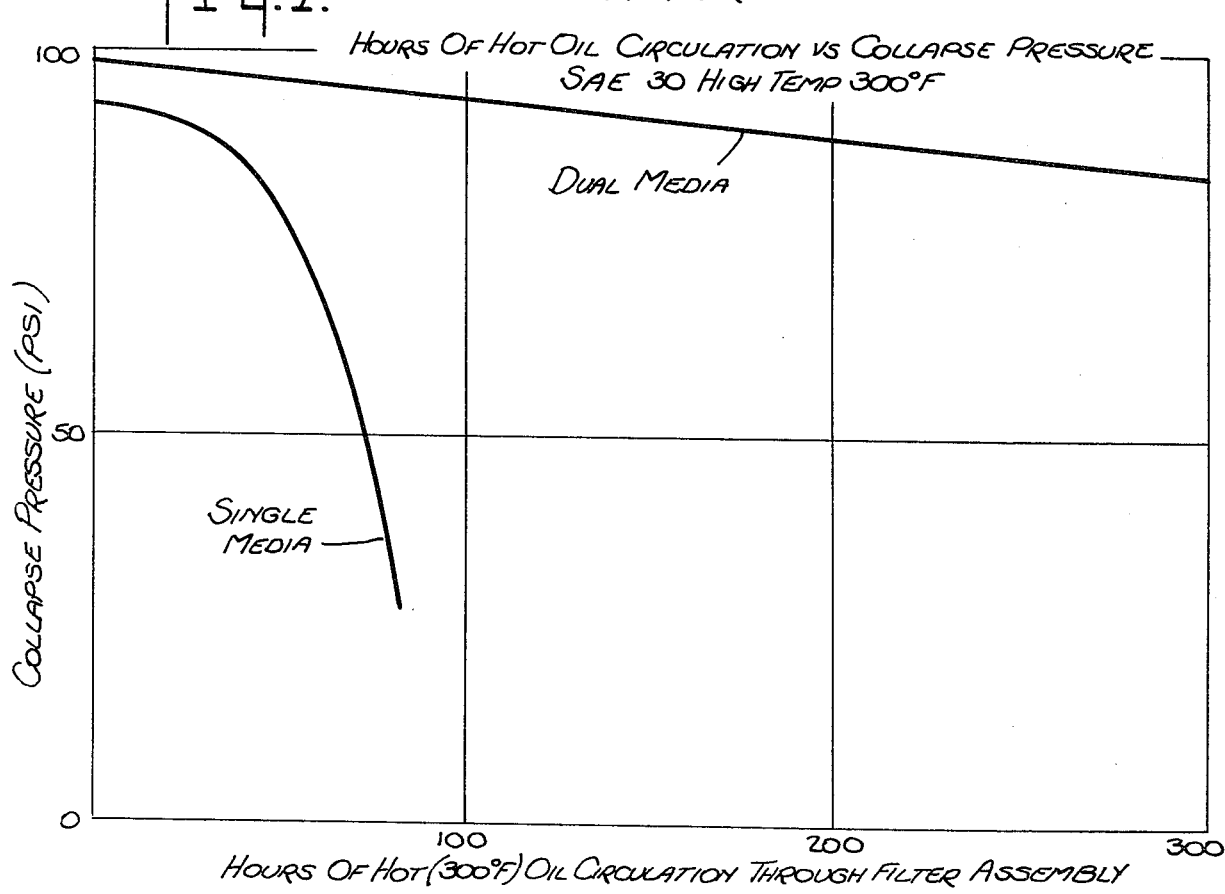

DUAL MEDIA FILTER

BACKGROUND OF THE INVENTION

Prior art oil filters for filtering the lubricating oil of internal combustion engines, have been used satisfactorily for a long time in the past.

Such an oil filter typically comprises a casing connected in the oil flow and internally containing a filter element formed by a cylinder of pleated resin-impregnated filter paper with its axial ends cemented and sealed in circular end caps held apart by a perforated center tube. The casing's internal construction is designed so that normally the oil flow is radially inwardly, or outside in, with respect to the pleated paper cylinder.

In the case of an automobile engine oil filter, the minimum life expectancy demanded has been some 6,000 miles of automobile travel, and for this service life the prior art filters were adequate.

Now automobile manufacturers and the public are demanding an oil filter having a much more extended service life, exemplified by the current demand for a so-called 15,000 mile automobile oil filter.

When the conventional oil filter with its prior art resin-impregnated pleated paper element is subjected to such an extended use, the paper element with time may rupture and/or collapse. This trouble is exaggerated by the fact that today automobile engines operate at much higher temperatures than before, lubricating oil temperatures in the range of 300° F. being commonly experienced.

Even in the past the same trouble was experienced when the pleated paper element was designed with unconventional pleat dimensions or when subjected to a pressure differential higher than was considered to be normal.

With the above in mind, the U.S. Royer et al. U.S. Pat. No. 3,334,753, Aug. 8, 1967, suggested the idea of a pleated element comprising two layers, the outer layer being the usual filter paper and the inner layer, pleated with the outer layer, comprising a rigid perforated wire material provided with openings bigger than the pores of the filter paper. Other rigid metal reinforcing members were incorporated. While this construction may have braced the paper layer against rupture or collapse, the obvious materials and manufacturing costs involved are commercially objectionable.

Ten years later the above concept is again suggested in the Pall U.S. Pat. No. 4,033,881, July 5, 1977. In this instance, the requirement for the rigid wall backing for the filter paper is repeated with emphasis. A rigid perforated metal wall is proposed. In addition, among other things, the use of spunbonded non-woven materials including those made of polyamide fibers is mentioned. The manner in which the patentee proposed to make such a material as rigid as metal, is not disclosed.

The object of the present invention is to provide a filter element particularly adapted for incorporation in an automobile engine oil filter and which will meet the current requirement for a 15,000 mile minimum service life but designed so that the filter materials and manufacturing costs are within commercially acceptable limits.

SUMMARY OF THE INVENTION

This invention is characterized in that instead of attempting to prevent a filter paper layer from rupturing or collapsing by means of a rigid foraminous backing wall, the paper is backed-up by a non-rigid layer of flexible, porous material having high tear and tensile strength as compared to the paper and having its edges or ends anchored so that when the paper tends to move in part or bodily downstream with respect to a fluid flow through the paper, the material behind the paper becomes tensioned and through its tear and tensile strength provides the required support.

The dual layers, one of the filter paper and the other of the flexible high tear and tensile strength material, are not bonded face-to-face together. Therefore, if the two layers start to bulge or deform slightly in the direction of the fluid flow through them, the two layers can slip or slide slightly relative to each other so that the inner layer of high strength material is stressed entirely or at least mainly by tearing and tension forces only, which are forces the material can carry without loss of its integrity. Its resistance to possible elastic stretching must be great enough to hold the paper layer against material deflection under the filter flow pressure involved.

This non-rigid material of high strength can be very thin and flexible as compared to the filter paper it supports. It need not perform any effective filtering action and preferably should have a lower flow resistance, or greater pore size, than does the paper. It should have greater resistance than the paper to deterioration when impregnated with hot lubricating oil, when the dual media is used as an oil filter under the extended time service conditions previously indicated.

When this dual filter media is made into an otherwise prior art cylindrical pleated oil filter element and is in service, the flow of oil under pressure tends to deflect the paper inwardly but the instant the paper attempts to move inwardly the high strength back-up material is tensioned, even if not pretensioned, between its anchored axial end edges so that deflection of the paper in whole or in part cannot become adequate to permit rupture or collapse of its pleats. The two layers are interpleated but can slide relative to each other, so there can be a slight flexing action providing a give-and-take effect. When the element is operating under service conditions with the flexible back-up material made of, for example, spunbonded plastic fibers resistant to the hot oil, this layer will not disintegrate or otherwise fail; if with time and hot oil flow the paper media weakens and attempts to either collapse or rupture, it cannot bodily or in part displace inwardly to a degree permitting appreciable collapse or any bursting in part.

As previously indicated, the back-up material should have a lower flow resistance than does the paper layer and the spunbonded fibrous material mentioned can be made so that it is not only of high tear and tensile strength, but also of larger pore size than conventional filter paper, particularly when made very flexible and thin as compared to the paper. It may be slightly elastically stretchable but its resistance to such stretching can be great enough to hold the paper layer against material deflection.

Automobile engine oil filters have been made and tested with the back-up material comprising a commercially available very thin (1.0 ounce per square yard) spunbonded, nylon, non-woven fabric made directly from molten polymer. Continuous filaments of the nylon are bonded at each crossover point so that the material is non-raveling, of great strength and resistant to propagation of snags and cuts. Nylon is adequately resistant to hot oil for long time periods. Because this is a spunbonded, non-woven fabric, it inherently can be considered to be a filtering material, but its pore size is greater than conventional resin-impregnated filter paper normally having a pore size screening out particles of 10 microns size at least.

When this new concept is embodied in an automobile engine oil filter of otherwise prior art construction, no unusal manufacturing problems need be involved, the interpleating of two layers being known, and the materials' costs are increased only to the extent of the relatively low cost of the high tear and tensile strength material; at the same time a filter that would otherwise have the restricted service life previously conventional, is converted to one having a life expectancy substantially beyond the 15,000 mile service life currently demanded.

BRIEF DESCRIPTION OF THE DRAWINGS

The accompanying drawings illustrate what is at present believed to be the best mode for carrying out the present invention as applied to an automobile engine oil filter, the various figures being as follows:

FIG. 1 is a perspective view showing a typical screw-on throw-away automobile oil filter, cut away to show the internal construction and the new dual element;

FIG. 2 is a fragmentary cross section taken on the line II—II in FIG. 1;

FIG. 3 is a fragmentary cross section of the top ends of a few of the pleats of the dual element with the layers separated slightly from their normal completely internesting relationship;

FIG. 6 graphically shows Mullin test values under long-time, hot-oil immersion conditions, for the paper only, for the high strength spunbonded material only and for the two combined as the new dual element; and FIG. 7 shows the collapse pressure values for a pleated filter element of paper only and for one using the dual construction, under long-time, hot-oil circulating conditions.

DETAILED DESCRIPTION OF THE INVENTION

Figure 4:
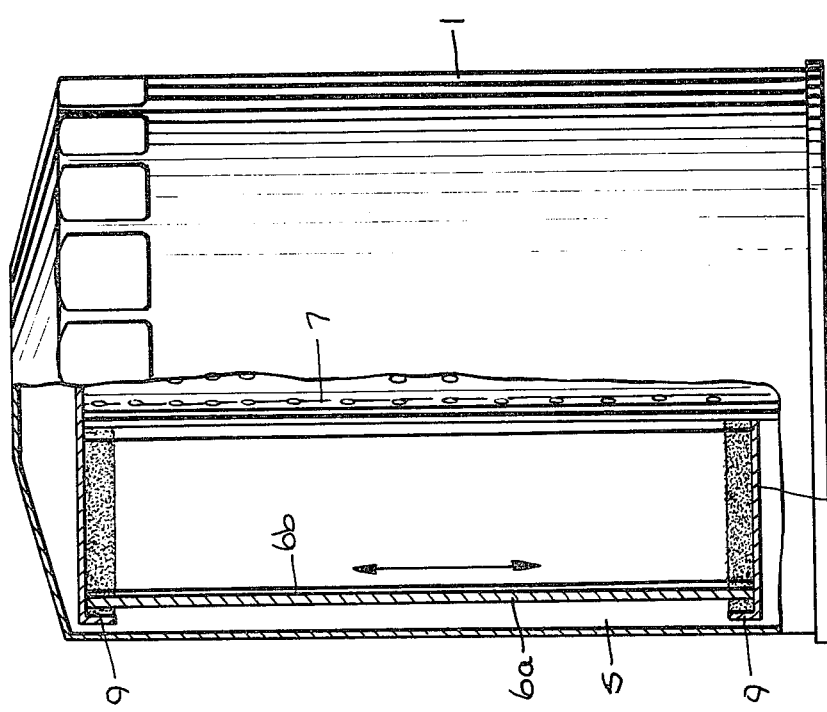
FIG. 4 is a vertical section showing a section through the outer apices of one of the pleats to show the two-layer construction and the manner in which the inner or back-up layer works in tension.

Having reference to the above drawings, FIGS. 1 and 4 show the generally conventional features of the filter as comprising a cup-shaped steel casing having a closed top end and a bottom end closed by a base plate 2 having an internally screw-threaded outlet 3 surrounded by an annular series of inlet openings 4. This base is designed to screw on to the filter mounting pad of an automobile engine so that the oil, suitably sealed against loss, is forced via the engine oil pump pressure into the holes 4 for passage through the casing and return to the engine oil system via the outlet 3. Internally the filter can be constructed as usual so that the oil entering the inlets 4 gains access to the annular space 5 surrounding the new filter element 6, the oil flowing radially inwardly through this element to and through the perforated center tube 7 so as to exit through the outlet 3.

As shown by FIG. 4, the perforated center tube 7 rigidly spaces apart the end caps 8 having the peripheral oppositely facing flanges 9 into which the axial ends of the cylindrically shaped filter element 6 nest and where they are secured and rigidly fixed to the end caps by being embedded in cement at those locations as disclosed for example by the Bell U.S. Pat. No. 2,642,187, June 16, 1953, excepting that today the end caps are usually made of sheet steel as is the perforated center tube 7.

As so far described, the construction may be conventional, the pleated cylindrical filter element 6 having its ends rigidly positioned and anchored by the end caps. Although not illustrated, the filter may have either or both a drainback valve and a by-passing valve built into its construction.

FIGS. 2 and 3 show the dual media construction using the principles of this invention. The resin-impregnated filter paper component is shown at 6a and the high strength flexible back-up layer is shown at 6b. In FIG. 3 the two layers are shown slightly separated from each other to illustrate clearly that both are pleated while FIG. 2 shows the manner in which the high-strength material 6b internests in pleated juxtaposition to the paper 6a. Both pleated layers are in face-to-face intercontact throughout their extents but are not bonded together.

The two strips of the materials of this dual media element can be simultaneously pleated together. During manufacture of the filter, the interpleated arrangement holds the relatively very flexible or flimsy back-up material in position. Thereafter the manufacture of the element can be completed. When the element is initially made, it is not believed that there is tension on either layer to any greater degree than in the case of the conventional pleated paper filter element. However, the ends of both layers are rigidly connected to the end caps rigidly held apart by the filter tube 7.

When in service, the pressure differential between the oil in the space 5 and the interior of the center tube 7 causes a force directed radially inwardly on both the paper media and the spunbonded material previously described and constituting the inner layer or back-up layer 6b. As the paper tends to deflect circumferentially, the inner layer 6b must become tensioned because of its anchored ends and because it is tensioned it becomes taut and resists inward deformation of the pleated filter paper component. The tension on the high tear and tensile strength inner layer 6b is indicated in FIG. 4 by the arrow T. As shown by FIG. 2, this tensioned high strength flexible layer 6b internests in pleated form and in face-to-face relationship throughout with the pleated paper 6a. The entire interior surface area of the pleated paper 6a is supported against circumferential deflection by the high tensile strength material 6b. Only at the seam required to form the pleated components into a cylinder, is there any face-to-face interconnection between the two layers and at this location the high strength material can be positioned behind the seam so that in conjunction with the multiple layers required at the seam, there is great inherent stiffness and collapse resistance along this one line. Excepting for this seam and for the interconnection between the two layers at their axial ends via the cement and end caps, both layers are free from each other; they are not interfastened by bonding material in face-to-face relationship, and they are free to slide relative to each other as the filter element in effect works slightly under fluctuating oil pressures. With each slight inward deformation of the filter element dual wall the high tensile inner layer 6b immediately tensions, becomes taut and resists further circumferential deformation on the part of the paper wall.

It follows that if the paper component tends to collapse or burst through lont-time exposure to hot oil flowing through the filter, that via the constant uniformly distributed reactive resistance provided by the high strength flexible layer on the inside, that paper element is held against collapse or bursting long after it would have failed without the back-up wall. Because this back-up wall may be a tough, durable, continuous filament spunbonded fabric laid down from continuous plastic filaments of high tensile strength and having adequate resistance to attack by the hot oil and possibly contaminants from the internal combustion engine, it can perform the functions described while having a life expectancy that is substantially extended insofar as current filter mileage service demands exist today. Because it is spunbonded fabric, it has substantially the same tear resistance and tensile strength in all directions including one of major importance to the present invention, namely, in the axial direction of the filter element walls extending between the end caps of the elements.

Spunbonded nylon, non-woven fabric sold under the trademark "Cerex" by the Monsanto Company, when used with the weight of 1.0 ounce per square yard of the material, has been found to have the porosity, flexibility and tear and tensile strength indicated for the practice of the present invention; nylon is very resistant to hot oil. "Cerex" is at least slightly elastically flexible so that it can stretch and recover elastically as this new two media filter wall works inwardly and outwardly in service.

Furthermore, "Cerex" has a slight moisture content in its as-sold condition and as this moisture is driven out by the passage of the hot engine oil flowing through the dual media, the "Cerex" experiences approximately a 2% shrinkage. Therefore, when the filter using this new element is in service, the inner back-up wall of "Cerex" becomes taut or pretensioned thus further assuring the described uniform support of the paper component through its extent.

Figure 5:
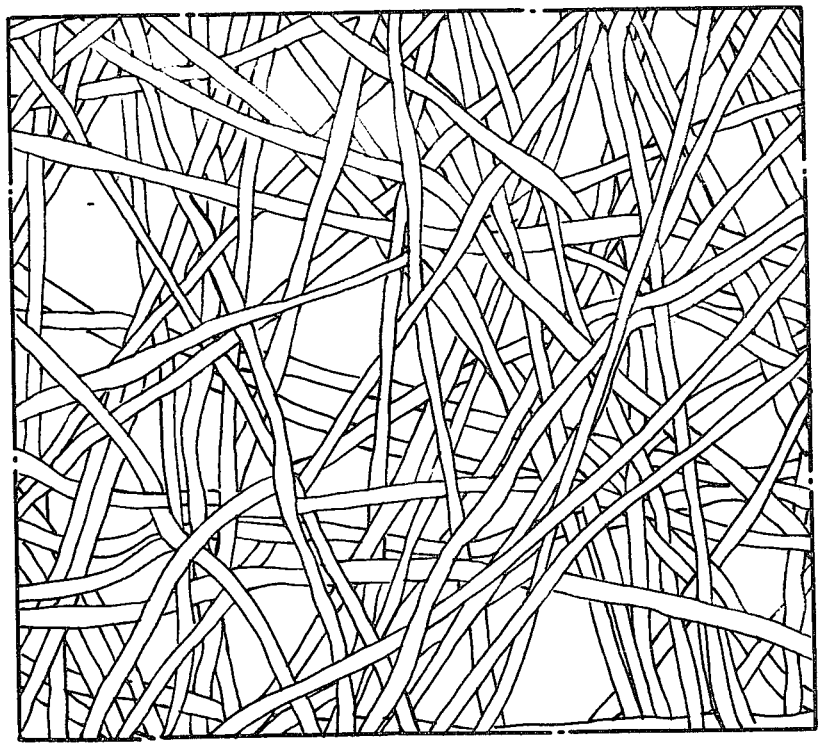
FIG. 5 is a plan view of the exemplar spunbonded fabric, enlarged about 80 times.

FIG. 5 serves to show, on approximately 80 times enlargement, the porous fibrous nature of spunbonded, non-woven fabric material in general and "Cerex" in particular. The interlacing of the continuous nylon filaments is at random in substantially all directions, resulting in a tough and durable fabric having the performance of nylon in general. It is a non-woven fabric made directly from the molten polymer, the continuous filaments of nylon being bonded at each crossover point. With the extreme thinness represented by one ounce of weight per square yard of material, this spunbonded fabric has a flimsy feeling, but it has the tear and tensile strength characteristics desired for the practice of the present invention. Other materials having the same characteristics in general can also be used.

Tests have been made on this new dual filtering media with the paper filter component consisting of a relatively high Basis Weight sheet in the 130 lbs per 3,000 square foot range. The paper was made of soft wood fibers as commonly used by filter-paper makers and was impregnated with a phenolic-type thermosetting resin. However, in the manufacture of the filter element, the filter paper could be made of other materials such as cotton linters, esparto, hard-wood fibers and possibly even synthetic fibers, while for impregnation other thermoplastic resins may be substituted for the conventional resin to protect the paper media against degradation in contact with the motor oil, water, gasoline and diesel fuel as well as engine combustion by-products.

In these tests the inner or back-up layer was "Cerex" having a weight of one ounce per square yard.

These tests included Mullin rupture testing with the two dual media layers just described immersed in hot oil (SAE 30 oil at 300° F.). The results of this testing is shown by FIG. 6.

In this FIG. 6 it can be seen how the PSI Mullin pressure rupture values for the paper only decrease rapidly from 0 to the 100 to 200 hour time periods. Well above this line is shown the Mullin rupture pressures with time and oil for the "Cerex".

When the time arrives to indicate burst potentiality on the part of the paper only, it would appear that the thin porous "Cerex" back-up material would have to carry the full pressure load and that for time periods extending beyond the 200 hour time roughly, it would be only the "Cerex" material that would be carrying the load, and therefore that for extended time periods the combination of the two layers should be about the same as for the "Cerex" only.

Surprisingly, with the paper and "Cerex" combined as the dual media shown in the top graph line on FIG. 6, very substantially increased Mullin rupture pressures are obtained as compared to those for "Cerex" only. The reason for this phenomenon is not understood at present but it does serve to show how well an oil filter made in accordance with the present invention can have a satisfactory service life extending far beyond the 15,000 mile demand.

The collapsing tendency of a cylindrical pleated media oil filter is, of course, of great importance and FIG. 7 serves to show how quickly the collapse pressure values decreases in the case of the single media comprising the resin-impregnated filter paper. The dual media of the present invention drops only slightly below the 100 psi collapse pressure range area during the 300 hours of testing with SAE 30 oil at 300° F., which were the test conditions of the results shown by FIG. 7.

The broad basic principles disclosed by the foregoing can be summarized as follows:

Any fluid filter comprising a layer of filter paper which for any reason requires support, can be backed-up by an inside layer of flexible material providing this material has anchored ends so as to become tensioned and tautened by inward deflection of the outside layer of filter paper and the inside layer of the flexible material. When tensioned, the paper is supported even though the back-up layer is flexible.

By permitting the two layers to slide relative to each other between those anchored ends, the two or dual layers can flex to the restricted degree required to prevent the rigidity of, for example, plywood where the various layers are bonded together.

For practical reasons, both of the two layers should have anchored ends and the inside or back-up layer should have greater tear and tensile strength between the anchored ends than does the paper it supports.

Preferably, the back-up layer or inside layer is a spunbonded, non-woven fabric made of filaments of plastic more resistant to the fluid temperature being filtered than is the filter paper.

Because it works in tension and has high tear and tensile strength, the inside or back-up layer can be a fabric having substantially greater flexibility and lighter weight than does the filter paper. Its porosity should be greater than that of the filter paper, the latter being relied on for filtration and the tensioned flexible back-up layer being relied on to maintain the integrity of the filter paper when the dual media, comprising the two layers, operates under conditions which would otherwise cause destruction or undesired deformation of the filter paper.

Application of these principles to an automobile engine oil filter, for example, with the two layers interpleated, but the filter otherwise being possibly of the usual prior art construction, provides an oil filter having an unusually extended service life. In this case the pleated dual media can have its ends anchored by the usual filter element end caps held apart by a perforated center tube, and if the inside or back-up layer is shrinkable via the passage of the hot oil, it becomes pretensioned so that its reaction to inward displacement of the outside layer of filter paper becomes possibly quicker in response to initial inward paper deformation than otherwise. Whether shrinkable or not, such inward deformation always causes tensioning of the inner flexible back-up layer with consequent tautening of this layer and, therefore, resistance to further inward deformation of the paper.

What is claimed is:

1. A fluid filter comprising a layer of flexible filter medium backed-up by a layer of flexible porous material of higher tensile strength than the filter medium and having interspaced anchored ends positioned opposite to each other so as to cause the material to become tensioned by deflection of the two layers in a direction towards the layer of said material, said layers being free from rigid resistance to said deflection.

2. The filter of claim 1 in which said layers can slide relative to each other between said anchored ends.

3. The filter of claim 2 in which both of said layers have said anchored ends.

4. The filter of claim 3 in which said medium is filter paper and said material has grearter tear and tensile strength between its anchored ends than does the paper.

5. The filter of claim 4 in which said material is a spunbonded, non-woven fabric made of filaments of plastic more resistant to hot oil than is said filter paper.

6. An outside-in oil filter element comprising outside and inside interpleated layers formed into a shape that is at least generally cylindrical and having means for anchoring both layers at the opposite ends of said shape so that the interspacing of these ends is fixed against substantial decreasing, said outside layer being filter paper and said inside layer being a flexible, porous fabric having greater tear and tensile strength than said paper at least in a direction extending between said ends, said layers being in relatively slidable face-to-face intercontact throughout at least the majority of their extents and being free from rigid restraint to deflection under pressurized oil flow therethrough.

7. The element of claim 6 in which said fabric is a spunbonded non-woven fabric made of interconnected filaments of a plastic more resistant to hot oil than is said filter paper.

8. The element of claim 7 in which said fabric has substantially greater flexibility and lighter weight than does said filter paper.

9. The element of claim 8 in which said fabric is shrinkable when heated by hot oil.

10. An automobile engine outside-in oil filter element comprising a rigid perforated center tube having radially extending rigid end caps and interpleated filter media formed into a cylindrical shape surrounding the center tube and having ends cemented to the end caps, said media consisting of an outside layer of flexible filter paper and an inside layer of flexible porous material having greater tear and tensile strength and greater resistance to hot oil than the filter paper, said layers being free to slide on each other between the end caps and the media being free from rigid support between the end caps, deflection of said layers caused by oil flow therethrough causing said inner layer to tension so that the inner layer supports the outside filter paper layer.

* * * * *